Nov. 22, 1960 P. S. WHITTLE 2,961,646
DEVICE FOR INDICATING LOOSENESS IN A VEHICLE WHEEL
Filed March 18, 1959
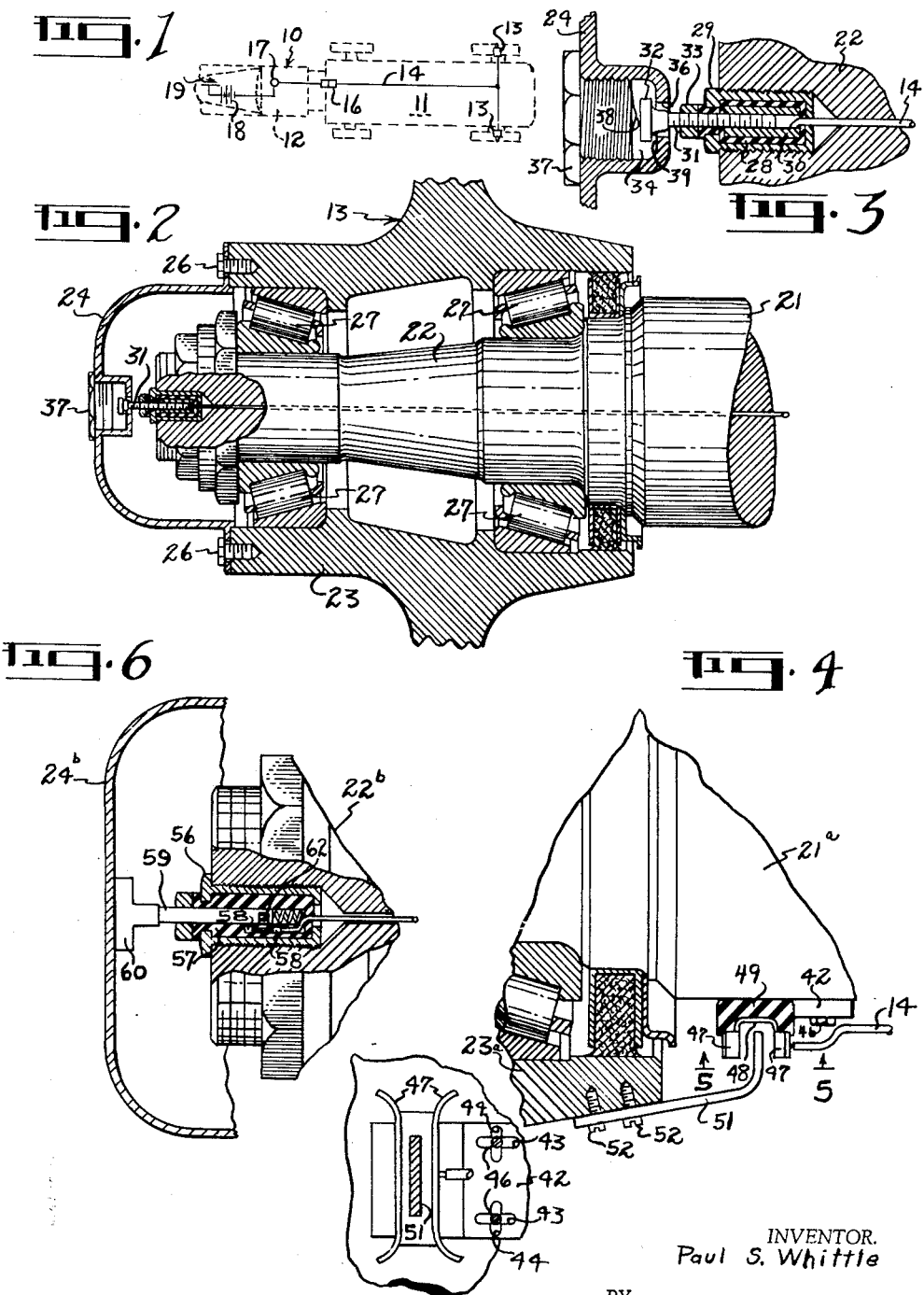
INVENTOR.
Paul S. Whittle
BY
Jennings, Carter & Thompson
Attorneys

2,961,646

Patented Nov. 22, 1960

2,961,646

DEVICE FOR INDICATING LOOSENESS IN A VEHICLE WHEEL

Paul S. Whittle, Birmingham, Ala., assignor to Alabama Trailer Company, a corporation of Alabama Filed Mar. 18, 1959, Ser. No. 800,143

2 Claims. (Cl. 340—269)

This invention relates to a device for indicating looseness in a vehicle wheel, and more particularly to electrical signal means operable by movement of the vehicle wheel hub a predetermined distance relative to the axle on which it is mounted.

It is an object of the present invention to provide an electrical signal device for indicating looseness in a vehicle wheel which is operable responsive to movement of the vehicle wheel a predetermined distance axially along the axle on which it is mounted.

It is a further object of the present invention to provide an electrical signal device for indicating looseness in an automobile wheel which is operable responsive to a predetermined eccentricity of the wheel and to movement of the vehicle wheel a predetermined distance axially along the axle on which it is mounted.

My invention comprises electrical terminals on the axle and the hub with an electrically non-conducting material insulating one of the terminals. One of the terminals is positioned between a pair of contacts spaced axially along the axle and movement of the wheel hub a predetermined axial distance along the axle electrically engages the terminal with one of the contacts to close an electrical circuit. Signal means are provided on the vehicle which are operable responsive to the closing of the circuit to indicate the predetermined movement of the wheel relative to the axle. Also, upon a predetermined eccentricity obtained by the wheel rotating about the axle, an electrical circuit is closed which actuates the signal means.

Apparatus embodying features of my invention is shown in the accompanying drawings, forming a part of this application, in which:

Fig. 1 is a diagrammatic view of my device shown installed on a vehicle;

Fig. 2 is a fragmentary, sectional view taken generally through a vehicle wheel hub mounted on an axle for rotation and showing one embodiment of my invention mounted between the axle and the hub cap;

Fig. 3 is an enlarged sectional view of the electrical actuating mechanism of the embodiment shown in Fig. 2;

Fig. 4 is a fragmentary sectional view of a further embodiment of my invention in which the actuating mechanism is mounted between the axle and the hub, with the terminal on the hub extending between a pair of contacts on the axle;

Fig. 5 is a sectional view taken generally along the line 5—5 of Fig. 4; and,

Fig. 6 is an additional embodiment in which a spring mounted plunger is mounted on the end of an axle and engages the hub cap.

Referring now to the drawings for a better understanding of my invention, I show in Fig. 1 a vehicle indicated generally by numeral 10 and comprising a semi-trailer 11 connected to a tractor 12. My signal actuating mechanism is indicated generally by the numeral 13 and is mounted on each of the rear wheels. An electrical line 14 connects the actuating mechanism 13 through a coupling 16 to a signal indicator 17 which is mounted on the dashboard of tractor 12. A battery 18 supplies electrical energy for the electrical circuit and a ground 19 is provided to complete the circuit. The metal body of the vehicle acts as the ground for the entire circuit.

Referring to the embodiment shown in Figs. 2 and 3, I show an axle indicated by the numeral 21 having a spindle 22 on an end thereof. A wheel hub is shown partially at 23 and a hub cap 24 is secured to the wheel hub by suitable securing means 26. Bearings 27 are mounted between hub 23 and spindle 22 on suitable races and wheel hub 23 rotates about spindle 22.

My signal actuating mechanism 13 comprises a threaded bushing 29 that is screwed into the end of spindle 22. A non-conductive insulating material 28 is mounted within bushing 29 and extends through the outer opening of bushing 29. A conducting sleeve 30 is positioned within the insulating material 28 and an electrical lead 14 is connected to sleeve 30 to supply electrical energy thereto from battery 18.

A threaded pin 31 is screwed within sleeve 30 and has a head 32 on the outer end thereof. A locking nut 33 is positioned on pin 31 and engages the end of the insulating material 28. Thus, pin 31 is insulated from spindle 22.

Hub cap 24 is recessed at 34 and has an opening 36 therethrough facing spindle 22. Opening 36 is slotted in one side thereof (not shown) to permit the head 32 to be moved into and out of the recessed portion 34 if desired. A threaded plug 37 is screwed in the recessed portion 34 and the inner end 38 forms a contact for head 32. The inner edge 39 of the recessed portion adjacent opening 36 forms a contact for the head 32 also. Thus, upon movement of wheel hub 23 outwardly from spindle 22 edge 39 will contact head 32 thereby completing an electrical circuit and energizing signal means 17 in tractor 12. Upon inward movement of hub 23, head 32 contacts the end 38 of plug 37 to complete the circuit. Also, upon a predetermined eccentricity obtained by rotation of hub 23 on spindle 22 the edges defining opening 36 contact pin 31 to complete the circuit. Pin 31 may be adjusted to predetermine the movement of hub 23 relative to spindle 22 at which the signal indicator 17 is actuated.

Referring now to Figs. 4 and 5 in which a second embodiment of my invention is shown, axle 21ª has a bracket 42 secured thereon. Bracket 42 has elongated slots 43 and 44 therein with screws 46 securing bracket 42 to axle 21ª. Thus, bracket 42 may be adjusted axially along axle 21ª and also about the circumference of axle 21ª. An electrical terminal is secured to bracket 42 and comprises a pair of spaced contacts 47 which extend in parallel relation and are spaced axially of axle 21ª. A third contact 48 is positioned between the pair of contacts 47. A non-conducting insulating material 49 is positioned between the terminal and axle 21ª and electrical lead 14 supplies electrical energy to the terminal from battery 18.

A terminal 51 is secured to hub 23ª by suitable screws 52 and extends between the pair of contacts 47. Thus, upon axial movement of hub 23ª, terminal 51 will contact one of the contacts 47 to complete the electrical circuit and thereby energize signal means 17. Also, upon an eccentricity in wheel hub 23ª, terminal 51 will engage contact 48 to complete the electrical circuit.

In Fig. 6 I show a third form of my invention in which a threaded bushing 56 is screwed into the end of spindle 22ᵇ and a non-conducting insulating sleeve 57 is provided within bushing 56. A pair of spaced contacts 58 is arranged below the inner circumference of the insulating sleeve 57. A plunger 59 is slidably mounted within insulating sleeve 57 and is biased outwardly by spring 61. A head 60 is provided on one end of pin 59 and frictionally engages hub cap 24$^b$ under the influence of spring 61. A spring mounted terminal 62 is mounted in pin 59. Since contacts 58 are positioned below the inner surface of the insulating sleeve 57 pin 59 does not engage contacts 58. However, as hub cap 24$^b$ moves, contact 62 is positioned over one of the contacts 58 and makes engagement therewith to complete the electrical circuit and thereby energize signal means 17. The embodiment shown in Fig. 6 is not adapted to indicate any eccentricity in the wheel rotating on the spindle, but indicates only axial movement of the wheel along spindle 22$^b$.

From the foregoing, it will be seen that I have provided an electrical signal device for indicating looseness in a vehicle wheel which is operable responsive to movement of the vehicle wheel a predetermined distance axially along the axle or spindle on which it is mounted. Further, I have provided signal means to indicate a predetermined eccentricity of the wheel rotating on the axle. By use of a single means, I am able to show the looseness of the wheel in both an axial direction along the spindle as well as a radial direction relative to the spindle.

While I have shown my invention in more than one form, it will be obvious to persons skilled in the art that it is not so limited, but is susceptible of various other changes and modifications without departing from the spirit thereof, and I desire, therefore, that only such limitations be placed thereupon as are specifically set forth in the appended claims.

What I claim is:

1. In a signalling apparatus on a vehicle indicating a predetermined axial movement of a vehicle wheel along an axle and a predetermined eccentricity of the wheel rotating on the axle, a wheel hub mounted on bearings on said axle, electrical terminals operatively connected to said axle and to said hub, an electrically non-conducting material insulating the terminal operatively connected to the axle and the terminal operatively connected to the hub being non-insulated, one of said terminals having a pair of oppositely facing contacts arranged in generally parallel relation and spaced axially of the axle to indicate axial movement of the wheel hub and a third contact adjacent said pair of contacts to indicate excess eccentric movement of the wheel hub on the axle, the other terminal being positioned between said pair of oppositely facing contacts and electrically engaging one of said pair upon movement of the hub a predetermined axial distance along the axle, said other terminal electrically engaging said third contact upon a predetermined eccentric movement of the wheel hub on the axle, and signal means operable responsive to engagement of said contacts with said other terminal to indicate the movement of said hub.

2. In signalling apparatus on a vehicle indicating a predetermined axial movement of a vehicle wheel along an axle and a predetermined eccentric movement of the wheel on the axle, a wheel hub mounted on bearings on said axle, an electrical terminal on said axle adjacent the wheel hub, an electrically non-conducting material insulating said terminal from the axle, a second terminal on said wheel hub and rotating therewith, one of said terminals having a pair of oppositely facing contacts arranged in generally parallel relation spaced axially of the axle and a third contact between the pair of contacts, the other terminal being positioned between said pair of contacts and electrically engaging one of the spaced contacts upon movement of the hub a predetermined axial distance along the axle, said other terminal engaging said third contact upon a predetermined eccentric movement of the wheel hub on said axle, and signal means operable responsive to engagement of said contacts with said other terminal to indicate excessive movement of said hub.

References Cited in the file of this patent

UNITED STATES PATENTS

| 2,853,569 | Neaverson | Sept. 23, 1958 |

FOREIGN PATENTS

| 355,631 | Germany | Mar. 11, 1921 |
| 148,914 | Austria | Mar. 10, 1937 |